(No Model.)

H. LEPPERT.
ANTIFRICTION WASHER FOR HINGES.

No. 605,105. Patented June 7, 1898.

Witnesses

Inventor
Henry Leppert
By James Shepard.
Atty.

UNITED STATES PATENT OFFICE.

HENRY LEPPERT, OF NEW BRITAIN, CONNECTICUT, ASSIGNOR TO THE RUSSELL & ERWIN MANUFACTURING COMPANY, OF SAME PLACE.

ANTIFRICTION-WASHER FOR HINGES.

SPECIFICATION forming part of Letters Patent No. 605,105, dated June 7, 1898.

Application filed August 18, 1897. Serial No. 648,672. (No model.)

*To all whom it may concern:*

Be it known that I, HENRY LEPPERT, a citizen of the United States, residing at New Britain, in the county of Hartford and State of Connecticut, have invented certain new and useful Improvements in Antifriction-Washers for Hinges, of which the following is a specification.

My invention relates to improvements in antifriction-washers for hinges and other bearings; and the main object of my improvement is simplicity and economy in construction.

Figure 1:
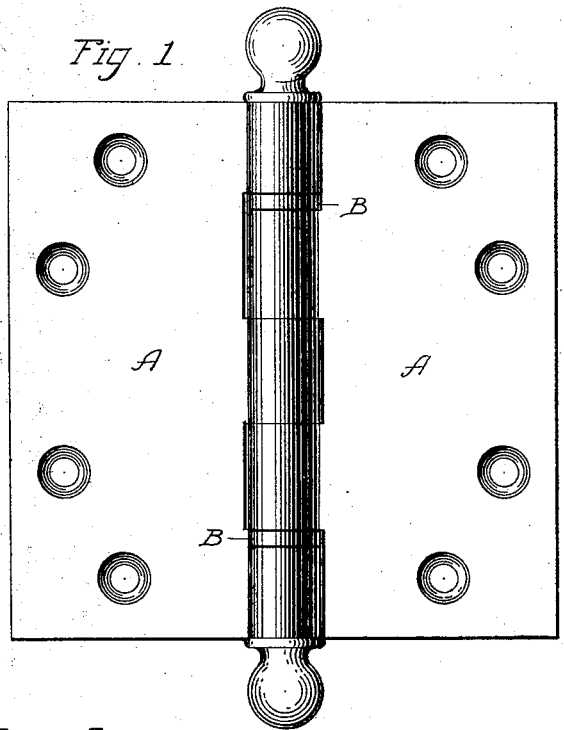
Figure 2:
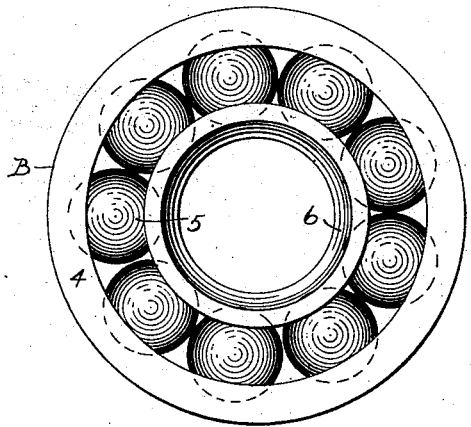
Figure 3:
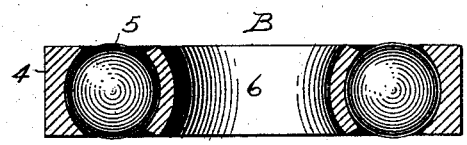

In the accompanying drawings, Figure 1 is a front elevation of a hinge with two of my washers applied thereto. Fig. 2 is an enlarged plan view of my said washer; and Fig. 3 is a vertical section thereof, the balls being shown in elevation.

A A designate the leaves of a loose pin-hinge, and B B designate my washer as interposed between the knuckles of the hinge. The said washer is composed of an outer ring 4, a series of balls 5, and an inner ring 6. Both of the rings 4 6 are preferably of less dimensions in the axial direction of the washer than the diameter of the balls, so that the balls project from both sides of the washer. The outer ring is formed in any proper manner, with its inner face properly grooved or curved to receive and hold the balls. The inner ring may be first formed as a hollow cylinder or tube, and then after the series of balls are properly arranged within the outer ring said tube may be inserted inside the circle of balls and the ends of the tube enlarged by swaging in suitable dies to make the ball contact-face of said ring partially embrace the balls, as shown. It is of course obvious that instead of swaging both ends of the tube simultaneously to complete the inner ring one end thereof may be given its desired form before placing it within the circle of balls and one end only be given the final shape by swaging it over upon the balls. When placed upon a hinge, the hinge-pintle extends through the inner ring.

I am aware that a foreign patent shows and describes an antifriction-washer consisting of an outer ring, a series of balls, and an inner holding-ring formed of two flat plates oppositely beveled at the edge which faces the balls, said plates being separately placed and held together by screws, and also a perforated plate or cage with one ball in each perforation, and that another foreign patent shows an antifriction-washer consisting of three rings and two series of balls, with a peripheral groove in one of the confining members for each series of balls, and a split ring applied therein for confining the balls. All of said prior art is hereby disclaimed.

By my improvement the construction is simple and inexpensive, and at the same time a very efficient and durable washer is produced without any parts that are liable to become detached.

I claim as my invention—

The herein-described antifriction-washer consisting of the outer ring, the series of balls projecting from said ring, and an inner holding-ring consisting of a short tube formed in a single piece of thin metal, with both ends of the said tube curved over the said series of balls, substantially as described.

HENRY LEPPERT.

Witnesses:
T. S. BISHOP,
M. S. WIARD.